United States Patent [19]
Melville

[11] Patent Number: 5,982,528
[45] Date of Patent: Nov. 9, 1999

[54] OPTICAL SCANNER HAVING PIEZOELECTRIC DRIVE

[75] Inventor: Charles D. Melville, Issaquah, Wash.

[73] Assignee: University of Washington, Seattle, Wash.

[21] Appl. No.: 09/009,760

[22] Filed: Jan. 20, 1998

[51] Int. Cl.[6] .................................................. G02B 26/08
[52] U.S. Cl. .................. 359/224; 359/198; 359/199; 359/213; 359/214; 359/223
[58] Field of Search ................................... 359/223, 224, 359/213, 214, 198–199

[56] References Cited

U.S. PATENT DOCUMENTS

| | | |
|---|---|---|
| 4,063,287 | 12/1977 | van Rosmalen . |
| 4,859,846 | 8/1989 | Burrer . |
| 4,942,766 | 7/1990 | Greenwood et al. . |
| 5,121,138 | 6/1992 | Schermer et al. . |
| 5,164,848 | 11/1992 | Firth et al. . |
| 5,245,463 | 9/1993 | Goto ........................................ 359/224 |
| 5,280,163 | 1/1994 | Barkan . |
| 5,280,377 | 1/1994 | Chandler et al. . |
| 5,295,014 | 3/1994 | Toda ........................................ 359/224 |
| 5,467,104 | 11/1995 | Furness, III et al. . |
| 5,488,862 | 2/1996 | Neukermans et al. . |
| 5,557,444 | 9/1996 | Melville et al. . |
| 5,587,836 | 12/1996 | Takahashi et al. . |
| 5,596,339 | 1/1997 | Furness, III et al. . |
| 5,625,483 | 4/1997 | Swartz . |
| 5,629,790 | 5/1997 | Neukermans et al. . |
| 5,648,618 | 7/1997 | Neukermans et al. . |
| 5,671,076 | 9/1997 | Matsubara et al. . |
| 5,694,237 | 12/1997 | Melville . |

*Primary Examiner*—James Phan
*Attorney, Agent, or Firm*—Steven P. Koda

[57] ABSTRACT

A piezoelectric circuit drives mirror movement along a scan path. The scanner includes a support, a reflective surface and a piezoelectric circuit. The support alternately rotates about an axis of rotation in a first direction and a second direction. The reflective surface moves with the support. The piezoelectric circuit is mechanically coupled to the support, and includes a first piezoelectric volume and a second piezoelectric volume. During a first portion of a drive cycle drive signals of opposite polarity cause the volumes to deform in opposing manner. The deformation causes the support to rotate in the first direction. During a second portion of the drive cycle the polarity of the drive signals switches again causing the volumes to deform, but in opposite manner than during the first portion of the drive cycle. The deformation causes the support to rotate in the second direction.

11 Claims, 8 Drawing Sheets

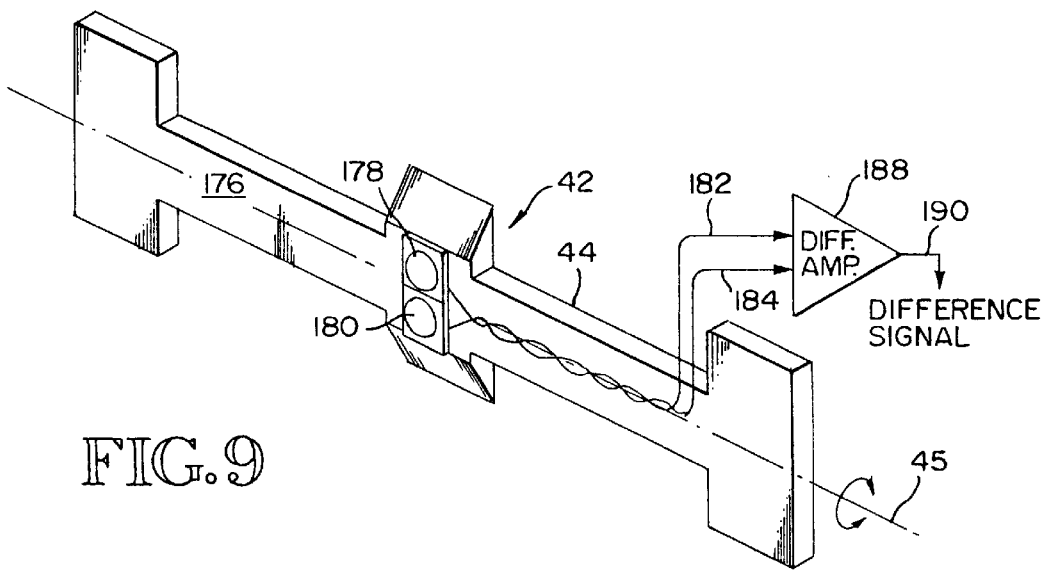

OPTICAL SCANNER HAVING PIEZOELECTRIC DRIVE

BACKGROUND OF THE INVENTION

This invention relates to optical scanner devices, and more particularly to a mechanical resonant scanner having a mirror which moves to deflect light along a scanning path.

Mechanical resonant scanners are used in retinal display devices to scan an image onto the retina of an eye. In an exemplary configuration one scanner is used to provide horizontal deflection of a light beam, while another scanner is used to provide vertical deflection of the light beam. Together the two scanners deflect the light beam at a changing angle to define a raster scanning pattern. By modulating the light beam and implementing multiple colors, a color image is scanned in raster format onto the retina.

Each scanner includes a mirror which receives the light beam. The respective mirrors are moved at a periodic rate over a prescribed angle. Such movement causes deflection of the light beam. The periodic rate is a scanning rate. For scanning a raster pattern there typically is a horizontal scanning rate for the horizontal scanner and a vertical scanning rate for the vertical scanner. The prescribed angle is referred to as a deflection angle. In the context of a retinal display the scanning rate and deflection angles are defined to meet the limits of the human eye. For the eye to continually perceive an ongoing image the light beam rescans the image, or a changing image, in periodic fashion. Analogous to refreshing a pixel on a display screen, the eye's retinal receptors must receive light from the scanning light beam periodically. The minimum refresh rate is a function of the light adaptive ability of the eye, the image luminance, and the length of time the retinal receptors perceive luminance after light impinges. To achieve television quality imaging the refresh rate is to be at least 50 to 60 times per second (i.e., $\geq$50 Hz to 60 Hz). Further, to perceive continuous movement within an image the refresh rate is to be at least 30 Hz.

To define a raster pattern in which millions of bits of information (e.g., light pixels) are communicated onto a small area (i.e., eye retina), the position of the mirror is controlled to a high degree of accuracy. In a conventional mechanical resonant scanner, the mirror is controlled by a magnetic circuit. The magnetic circuit includes a pair of permanent magnets and a pair of electromagnets. A shortcoming of such a drive mechanism is the added weight of the magnets.

FIG. 1 shows a conventional scanner 10 having a mirror 12 and a spring plate 14. The mirror 12 and spring plate 14 are the only moving parts. The scanner 10 also includes a base plate 16 having a pair of stator posts 18, 20. Stator coils 22, 24 are wound in opposite directions about the respective stator posts 18, 20. The coil windings are connected in series or in parallel to a drive circuit. On opposite ends of the base plate 16, permanent magnets 26, 28 are mounted. The magnets are equidistant from the posts 18, 20. The spring plate 14 has enlarged opposite ends 30 that rest on a pole of a respective permanent magnet. The magnets are oriented to have the same pole in contact with each end of the spring plate 14. Thus, the opposite pole of each magnet 26, 28 is located adjacent to the base plate 16. The spring plate 14, magnets 26, 28 and the base plate 16 are tightly clamped together by respective caps 34, 36.

Magnetic circuits are formed in the scanner 10 so as to oscillate the mirror 12 about an axis of rotation 15. A first magnetic circuit extends from the top pole of the magnet 26 to the spring plate end 30, through an arm of the spring plate and mirror 12 across a gap to the stator pole 18, then through the base plate 16 back to the permanent magnet 26. A second magnetic circuit extends a similar path but through the stator post 20 instead of the stator post 18. A third magnetic circuit extends from the top pole of the magnet 28 to the opposite spring plate end 30, through an arm of the spring plate and mirror 12 across a gap to the stator pole 18, then through the base plate 16 back to the permanent magnet 28. A fourth magnetic circuit extends a similar path but through the stator post 20 instead of the stator post 18. A periodic drive signal is applied to the oppositely wound coils 22, 24 creating magnetic fields which cause the mirror 12 to oscillate back and forth about the axis of rotation 15. The phase angle of the mirror is not detected. A pair of frequency adjustment screws 37, 38 can be adjusted so as to increase or decrease the tension in the spring plate 14. Variation of such tension increases or decreases the resonant frequency of the scanner 10.

SUMMARY OF THE INVENTION

According to the invention, a piezoelectric circuit is implemented to drive mirror movement within a resonant optical scanner having a high Q mirror system. The piezoelectric circuit is used in place of a magnetic circuit.

According to one aspect of the invention, the scanner includes a reflective surface, a support and a piezoelectric circuit. The support includes or carries the reflective surface and moves in response to the piezoelectric circuit. The support alternately moves relative to an axis of rotation in a first direction and a second direction. In a preferred embodiment the support is a torsion spring subjected to a twisting force which twists the spring along the axis in the first direction or second direction. The torsion spring provides a restoring force to untwist the spring when the twisting force decreases below a threshold and becomes insufficient to overcome the restoring force. The rotation or twisting in the first direction occurs between a first extreme rotational position and a second extreme rotational position. The rotation or twisting in the second direction occurs between the second extreme rotational position and the first extreme rotational position. An advantage of the spring quality and restoring force is that a resonant 'pendulum-like' system is achieved by adding a relatively small proportion of energy to the system at each swing (e.g., rotation or twist).

The reflective surface moves with the support, such that the alternate rotation of the support about the axis of rotation defines an oscillatory motion of the reflective surface. The motion of the reflective surface changes the deflection angle of light to scan light along a desired path (e.g., a horizontal line scan or a 2-dimensional raster scan).

According to another aspect of the invention, the piezoelectric circuit is mechanically coupled to the support, and includes a first piezoelectric volume and a second piezoelectric volume. During a first portion of a drive cycle the first piezoelectric volume receives a first drive signal causing the first piezoelectric volume to deform. In addition, the second piezoelectric volume receives a second drive signal causing the second piezoelectric volume to deform. The second drive signal is of opposite polarity to the first drive signal causing the second piezoelectric volume to deform in a manner opposite deformation of the first piezoelectric volume. The deformation of the first piezoelectric volume and the second piezoelectric volume in response to the first drive signal and second drive signal causes the support to rotate in the first direction between the first extreme rotational position and the second extreme rotational position. During a second portion of the drive cycle the polarity of the first drive signal and the second drive signal reverse again causing the first piezoelectric volume to deform and the second piezoelectric volume to deform. The first piezoelectric volume deforms in a manner opposite deformation of the second piezoelectric volume. The deformation of the first piezoelectric volume and the second piezoelectric volume during the second portion of the drive cycle causes the support to rotate in the second direction between the second extreme rotational position and the first extreme rotational position.

According to another aspect of the invention, the piezoelectric circuit further includes a frame which is attached to the support and to which are attached the first piezoelectric volume and the second piezoelectric volume. The deformation of the first piezoelectric volume and the second piezoelectric volume bend the frame, which in turn causes rotation of the support.

In one embodiment first and second piezoelectric circuits are coupled to respective first and second elongated portions on opposite sides of the reflective surface. In an alternative embodiment first and second piezoelectric circuits are coupled to respective first and second end portions of the support.

According to another aspect of the invention, the piezoelectric circuit also includes a frame. The frame is mounted to a base for the scanner. The frame is attached to the support. The first and second piezoelectric volumes are attached to the frame. The respective and opposing deformations of the first and second piezoelectric structures cause the frame to bend, which in turn causes the support to rotate or twist in one direction. Reversing polarity of the drive signals causes opposite deformation, which in turn causes opposite bending of the frame and rotation of the support in the second direction. The effect is a movement of the mirror between one extreme angle and another extreme angle. Rotation of the mirror is 180 degrees out of phase with the movement of the frame. The rotation of the mirror causes deflection of light along a horizontal (or vertical or other) scan path.

One advantage of this invention is that a piezoelectric drive circuit is light in weight and small in volume relative to prior conventional drive circuits formed with electromagnets and permanent magnets. These and other aspects and advantages of the invention will be better understood by reference to the following detailed description taken in conjunction with the accompanying drawings.

BRIEF DESCRIPTION OF THE DRAWINGS

FIG. 9 is perspective view of the scanner support with mirror position sensors.

DESCRIPTION OF SPECIFIC EMBODIMENTS

Scanner Overview

Figure 1:
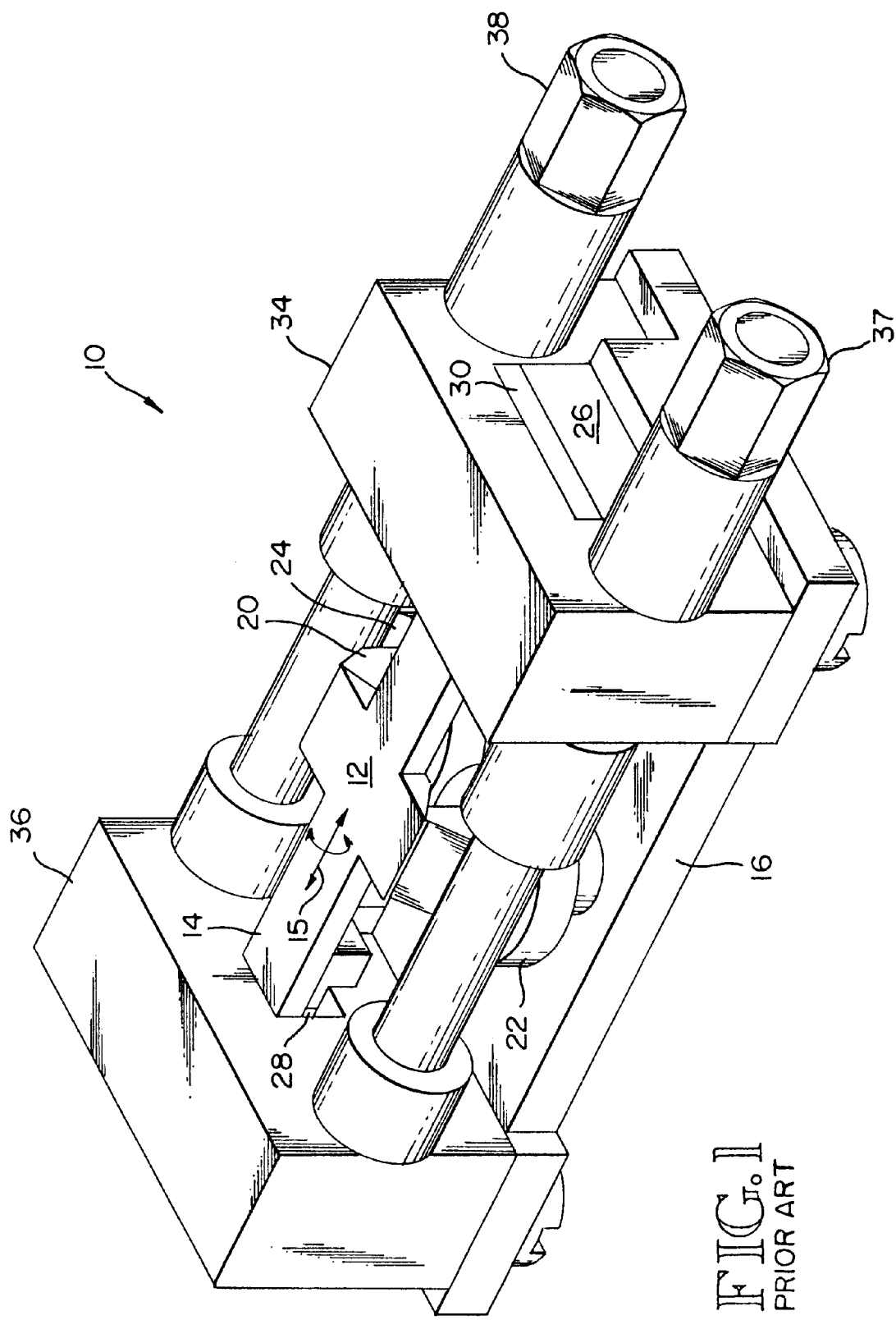
FIG. 1 is a perspective view of a conventional mechanical resonant scanner.
Figure 2:
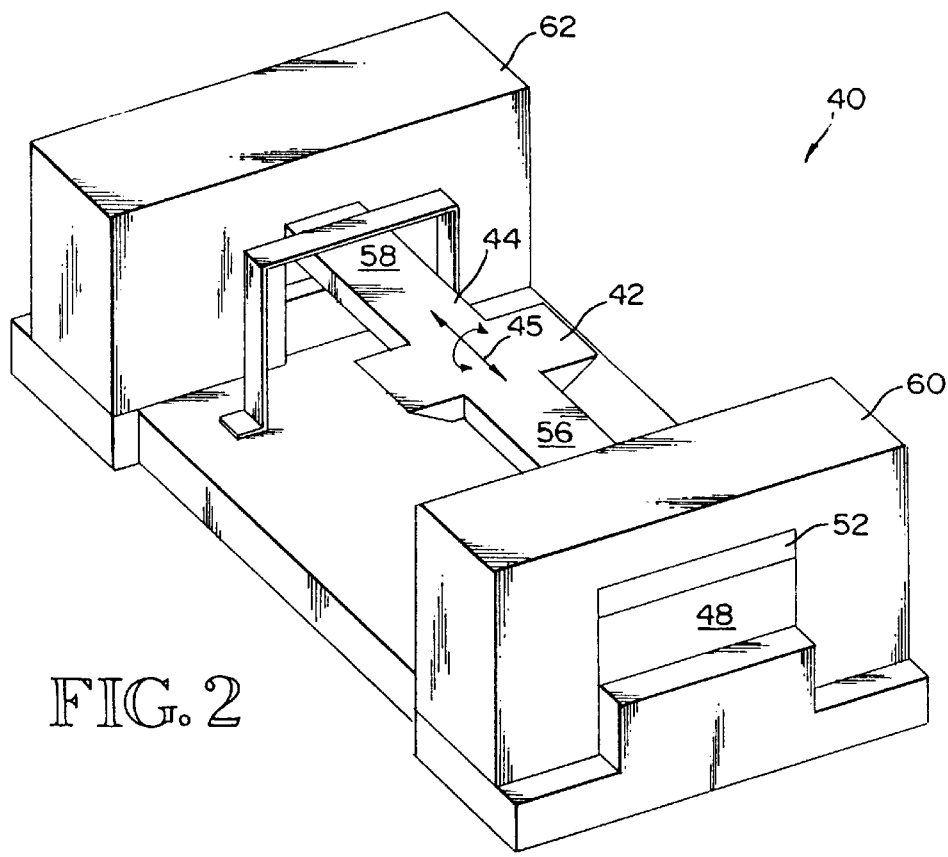
FIG. 2 is a perspective view of a mechanical resonant scanner according to an embodiment of this invention.
Figure 3:
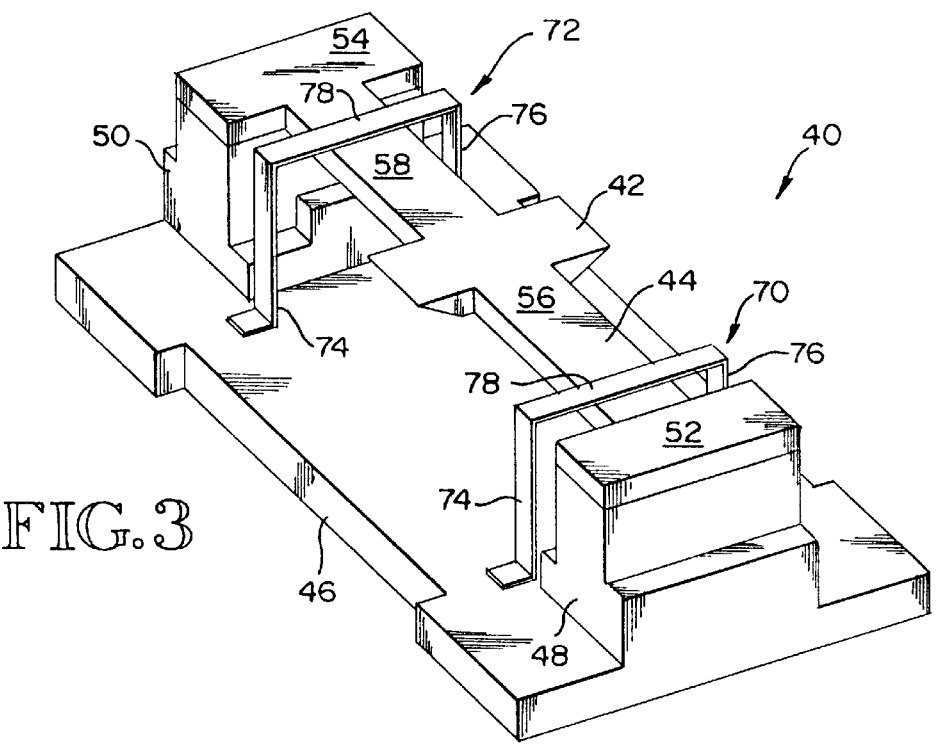
FIG. 3 is a partial view of the scanner of FIG. 2.

FIGS. 2–3 show an optical scanner 40 according to an embodiment of this invention. The scanner 40 includes a mirror 42 and a support 44. The mirror 42 is formed integral to or separate from the support 44. In one embodiment the mirror 42 is formed by a smooth, polished reflective surface area of the support 44. In another embodiment the mirror 42 is a separate structure mounted to the support 44. The scanner serves to deflect light incident to the mirror 42. The support 44 oscillates about an axis of rotation 45 moving the mirror 42 back and forth between a first extreme angle and a second extreme angle at a resonant frequency. For a given drive cycle the mirror 42 is moved from an initial orientation to a first extreme angle, then back through the initial orientation to a second extreme angle, then back again to the initial orientation. Continuing drive cycles result, in oscillatory motion of the mirror 42. By changing the orientation of the mirror over time, light incident to the mirror is deflected at varying angles. By repeating the changes in orientation in a cyclic manner the light is deflected across a scan path in a cyclic manner. In one implementation, the optical scanner 40 serves as a horizontal line scanner for a virtual retinal display. Each line of the display is generated by deflecting the light along a horizontal line scan.

The scanner 40 also includes a base plate 46. The base plate includes respective seats 48, 50 for respective ends 52, 54 of the support plate 44. In one embodiment the support 44 is formed of spring steel and is a torsional type of spring which twists about the axis 45. The torsion spring has a spring constant determined by its length, width and thickness. Preferably, the support 44 has a high Q value such that once the support plate starts moving very little energy is lost. As a result, very little energy is added during each period of movement to maintain a constant amplitude of motion of the support 44. For a high Q system the energy loss per cycle can be less than 0.001%. In alternative embodiments a variety of other structures may be used to carry and move the mirror. Whereas a torsion spring moves in a twisting manner to move the mirror, other rotational motions about the axis 45 are achieved by a support embodied as a longitudinally flexing spring, or an axle with bearings.

Narrower arm portions 56, 58 of the support 44 extend from each of the enlarged ends 52, 54 to an enlarged central mirror portion 42. The support 44 and base plate 46 are tightly clamped together by respective caps 60, 62. Each cap 60, 62 is formed as a block with an opening. The respective opening is formed so that each respective cap 60,62 can accommodate a support end 52/54 and a seat 48/50, as well as part of a support arm 56/58. Each cap is held securely to the base plate 46 by a pair of screws so as to clamp the support 44. There is space within each cap 60/62, however, for the respective support end 52/54 to move during motion of the support 44 about the axis of rotation 45.

Piezoelectric Circuits

The movement of the support 44 is driven by a pair of piezoelectric circuits. Each piezoelectric circuit includes piezoelectric volumes 80, 82 mounted, attached or integral to a frame 70/72 (see FIGS. 4a–c). As shown in FIG. 3, the frames 70, 72 are in physical communication with the support 44. The piezoelectric circuits induce a twisting motion upon the support 44 to move the mirror 42 in an oscillatory manner about the axis 45.

In some embodiments the support 44 and frames 70, 72 are formed by a one-piece integral construction. In other embodiments the frame is positioned to contact the support 44. The frames 70, 72 are mounted, attached or integral to the base plate 46. In one embodiment the frames 70/72 are soldered. In other embodiments, the frames 70, 72 are screwed, adhered or otherwise attached to the base plate 46. Each frame 70/72 includes two posts 74, 76 and a cross beam 78. The cross-beam 78 is centered over an arm portion 56/58 of the support 44. In one embodiment the cross-beam 78 is adhered to the arm portion 56/58 so as to mechanically couple any deflection of the cross-beam 78 to the support 44.

Figure 4A:
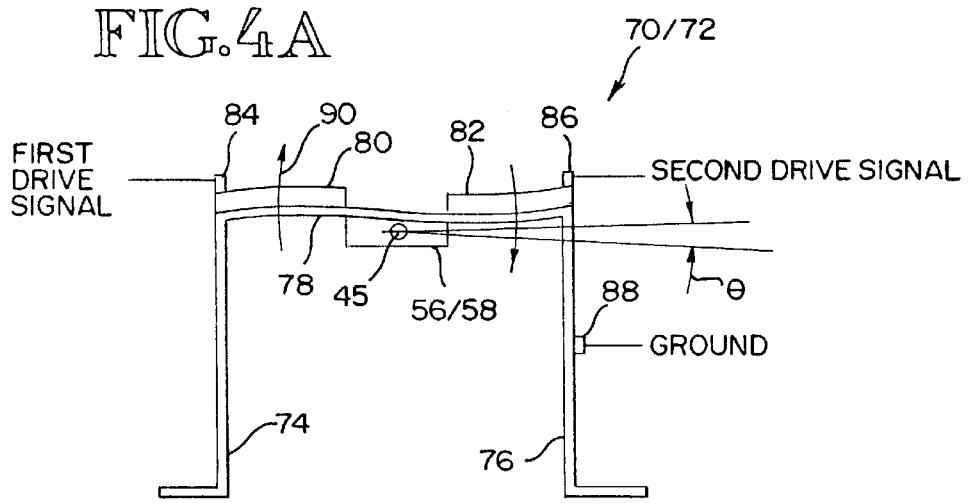
FIGS. 4a–c are diagrams of a piezoelectric circuit of FIG. 3 in various mechanical positions.
Figure 4B:
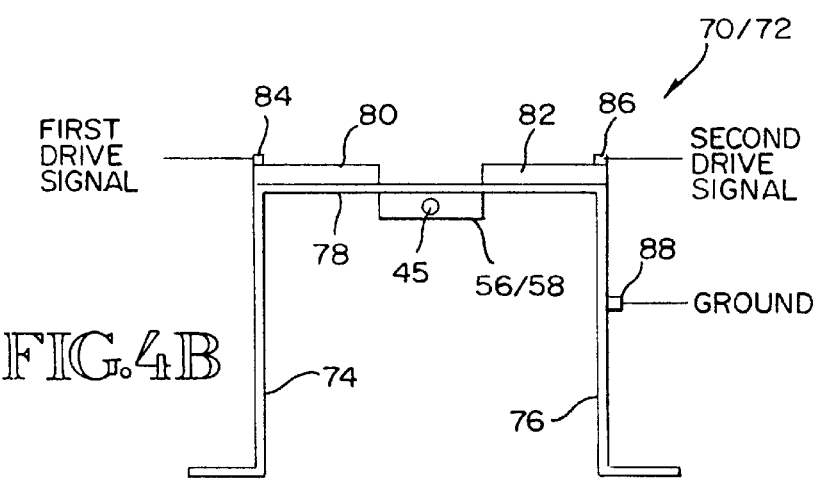
Figure 4C:
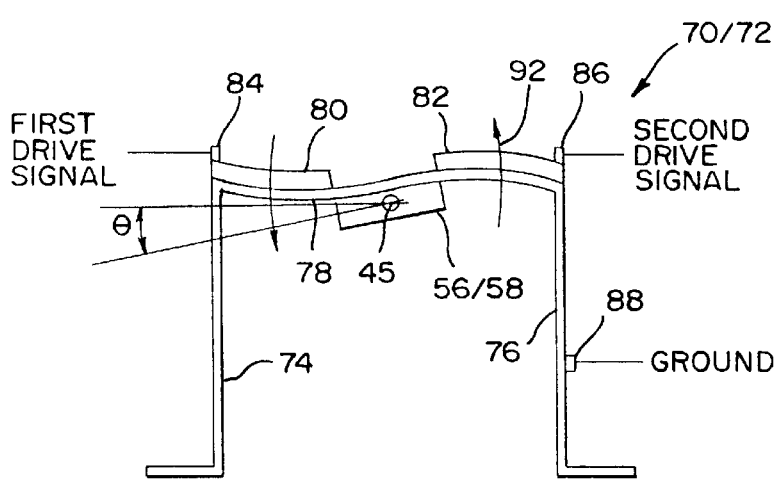

Also attached to each frame 70/72 are two piezoelectric volumes 80, 82. FIGS. 4a–4c show a frame 70/72 and the attached volumes 80, 82 and support arm 56/58. Although the volumes 80, 82 are shown above the cross-beam 78 and the support arm 56/58 below the cross-beam 78, such relative positioning can vary. The first piezoelectric volume 80 receives a first drive signal at a first contact 84. The second piezoelectric volume 82 receives a second drive signal at a contact 86. The first and second drive signals are grounded by a ground connection to the frame at a ground contact 88. The piezoelectric volumes 80, 82 have the same volume. Such volume is constant during the operation of the scanner 40. When a piezoelectric volume 80/82 receives a drive signal of a first potential, the shape of the piezoelectric volume 80/82 changes to be shorter and fatter. When a piezoelectric volume 80/82 receives a drive signal of a second potential opposite the first potential, the shape of the piezoelectric volume 80/82 changes to be longer and thinner. It is by controlling the first and second drive signals that the rotation of the support 44 is controlled.

Each frame 70/72 serves as a respective piezoelectric circuit. In the embodiment shown in FIGS. 2 and 3 there are two piezoelectric circuits. At rest, when no drive signals are applied, the support 44 is level relative to the base plate 46. FIG. 4b shows a piezoelectric circuit at an initial rest position. By applying a first drive signal to the first piezoelectric volumes 80 of each circuit, the first volumes 80 change shape in the same manner. Such first volumes 80 are located on the same side of the cross-beam 78 (e.g., side closest to post 74), and thus to the same edge of the mirror 42. Similarly, by applying a second drive signal to the second piezoelectric volumes 82 of each circuit, the second volumes 82 change shape in the same manner. Such second volumes 82 are located on the same side of the cross-beam 78 (e.g., side closest to post 76), and thus to the same edge of the mirror 42. By having the first drive signal and second drive signal be of opposite polarity the shape of the first piezoelectric volumes 80 differs from that of the second piezoelectric volumes.

FIG. 4a shows the piezoelectric circuit and frame 70/72 in which the first piezoelectric volumes 80 get longer and thinner, while the second piezoelectric volumes 82 get shorter and fatter (relative to the initial shapes of FIG. 4b). This type of construction is referred to as a bimorph. Such deformation of the volumes 80, 82 causes the frame cross-beam 76 to deflect, which in turn causes the support 44 to rotate in a first direction 90. After a prescribed time period, the polarity of the first drive signal and second drive signal are reversed. The support 44 at a first extreme deflection angle moving in a first direction of rotation 90 now reverses direction into a second direction 92 of rotation. The piezo-electric volumes 80, 82 begin to changes shapes heading toward an opposite deformation. This causes the frame cross-beam 76 to return to the initial position of FIG. 4b and continue a deflection as shown in FIG. 4c toward a second extreme deflection angle. The support 44 coupled to the cross-beam 76 also moves through the initial position to a second extreme position. FIG. 4c shows the first piezoelectric volumes 80 deformed to be get shorter and fatter, while the second piezoelectric volumes 82 get longer and thinner (relative to the initial shapes of FIG. 4b). Again the polarities of the first and second drive signal are reversed bringing the cross-beam and support 44 back to and through the initial position. Thus, FIG. 4a shows the piezoelectric circuit and frame 70/72 moving toward a first extreme deflection. FIG. 4b shows the piezoelectric circuit and frame 70/72 in the initial position. FIG. 4c shows the piezoelectric circuit and frame 70/72 moving toward a second extreme deflection, opposite the first extreme deflection.

Figure 5:
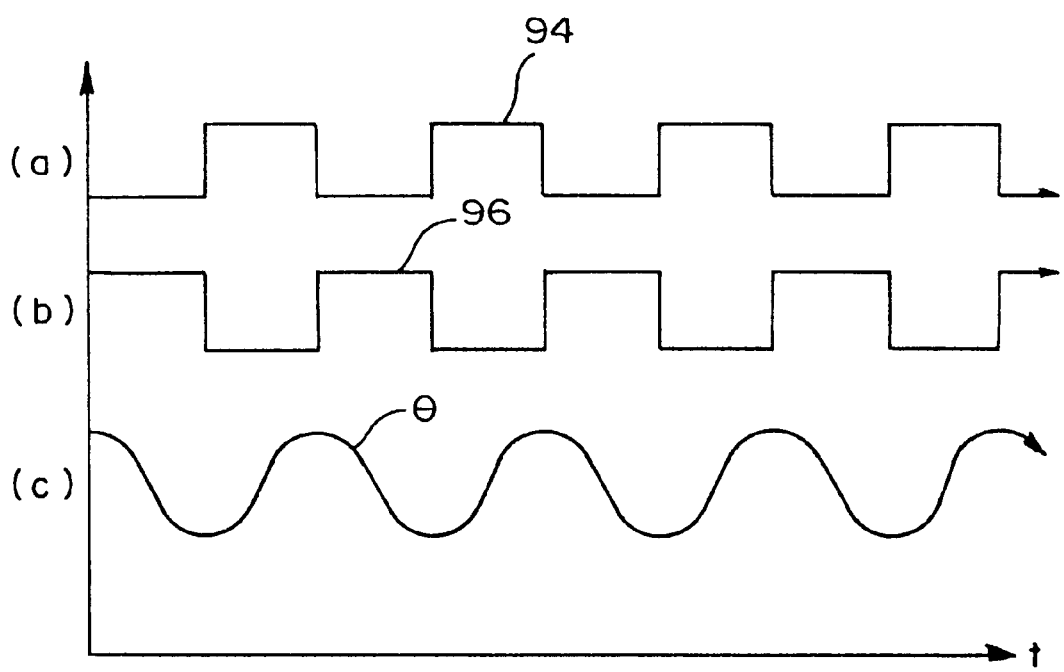
FIG. 5 is a graph of waveforms for a first drive signal, a second drive signal and a deflection angle.

The rotational angle of the support 44 at any given time is labeled as θ. FIG. 5 shows respective waveforms (a), (b) and (c) for the first drive signal 94, the second drive signal 96 and the deflection angle θ. Note that during movement of the mirror 42, the first drive signal and second drive signal are at different polarities (or logic levels). Also note that the motion of the mirror 42 and support 44, as shown by the waveform for the deflection angle θ, is sinusoidal.

Alternative Embodiment

Figure 6:
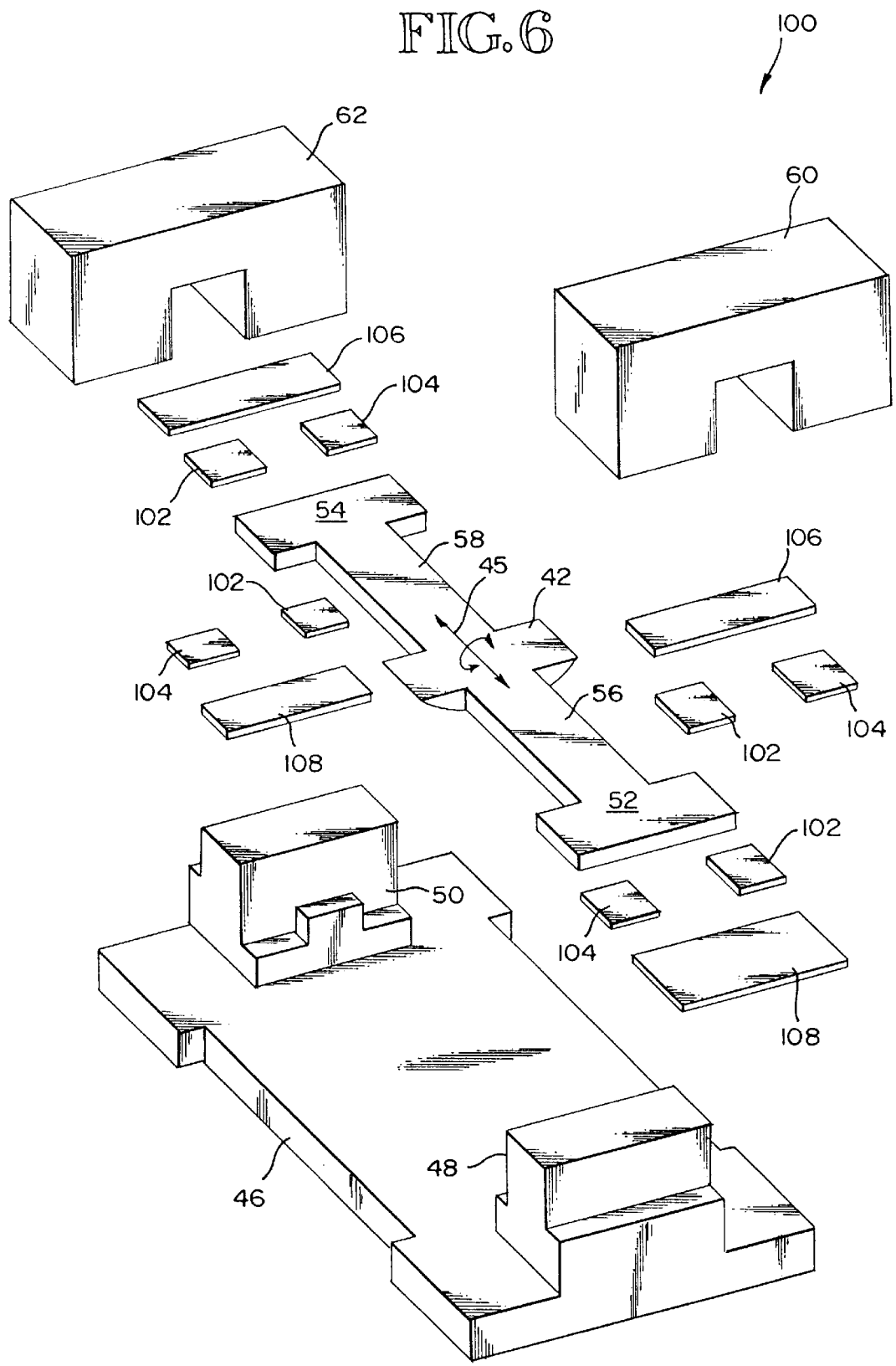
FIG. 6 is an exploded view of a mechanical resonant scanner according to another embodiment of this invention.

FIGS. 6 and 7 show an optical scanner 100 according to an alternative embodiment of this invention. FIG. 6 is an exploded view of the scanner 100 components. Like components relative to the first embodiment of FIGS. 2 and 3 are given the same part numbers. The scanner 100 of FIGS. 6 and 7 is similar to the scanner 40 of FIGS. 2 and 3. The piezoelectric circuits, however, are positioned at the ends of the support 44 in the scanner 100, rather than along the arm portions 56, 58 as in the scanner 40. Thus, the scanner 100 includes a mirror 42 and a support 44. The support 44 oscillates about an axis of rotation 45 moving the mirror 42 back and forth between a first extreme angle and a second extreme angle. For a given drive cycle the mirror 42 is moved from an initial orientation to a first extreme angle, then back through the initial orientation to a second extreme angle, then back again to the initial orientation. Continuing drive cycles result in oscillatory motion of the mirror 42 wherein the mirror moves 180° out of phase with ends 52 of the support 44. By changing the orientation of the mirror over time, light incident to the mirror is deflected at varying angles θ. By repeating the changes in orientation in a cyclic manner the light is deflected across a scan path in a cyclic manner.

The scanner 100 also includes a base plate 46. The base plate includes respective seats 48, 50 for respective ends 52, 54 of the support 44. Narrower arm portions 56, 58 of the support 44 extend from each of the enlarged ends 52, 54 to an enlarged central mirror portion 42. The support 44 and base plate 46 are tightly clamped together by respective caps 60, 62. Each cap 60, 62 is formed as a block with an opening. The respective opening is formed so that each respective cap 60, 62 can accommodate a support end 52/54, a seat 48/50, and components of a piezoelectric circuit. Each cap is held securely to the base plate 46 by a pair of screws so as to clamp the support 44. There is space within each cap 60/62, however, for the respective support end 52/54 to move during motion of the support 44 about the axis of rotation 45.

Figure 7A:
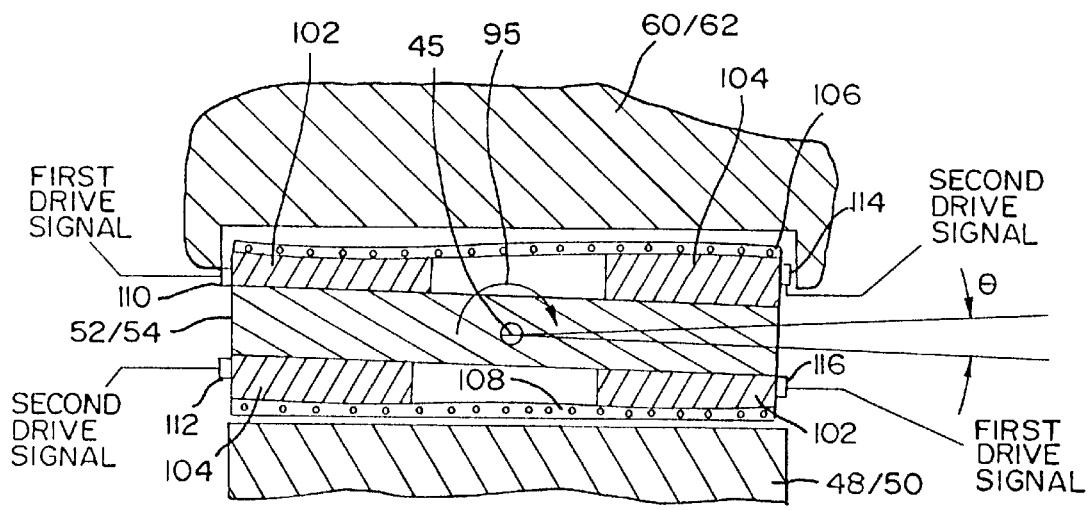
FIGS. 7a–c are diagrams of a piezoelectric circuit of FIG. 5 in various mechanical positions.
Figure 7B:
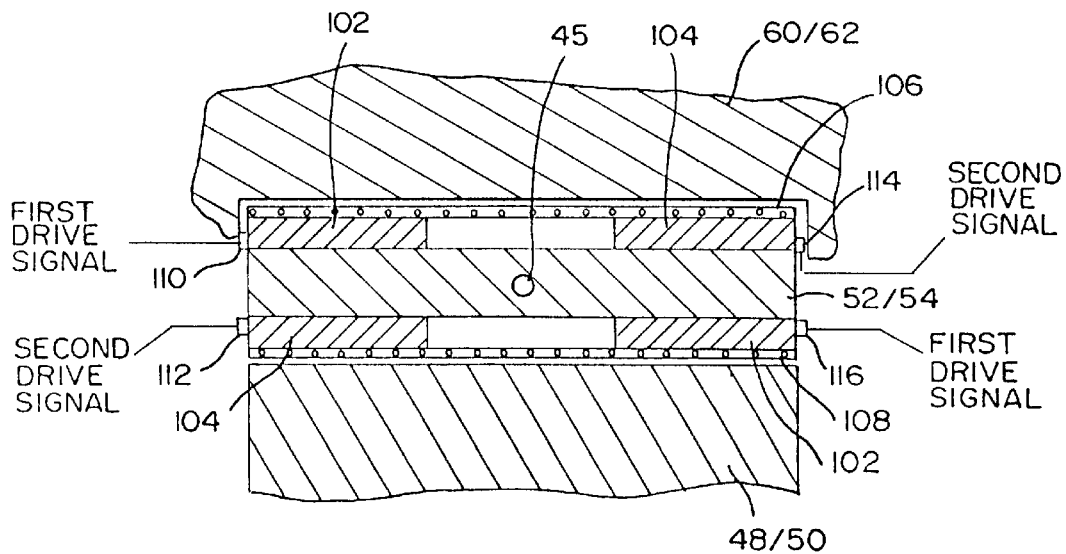
Figure 7C:
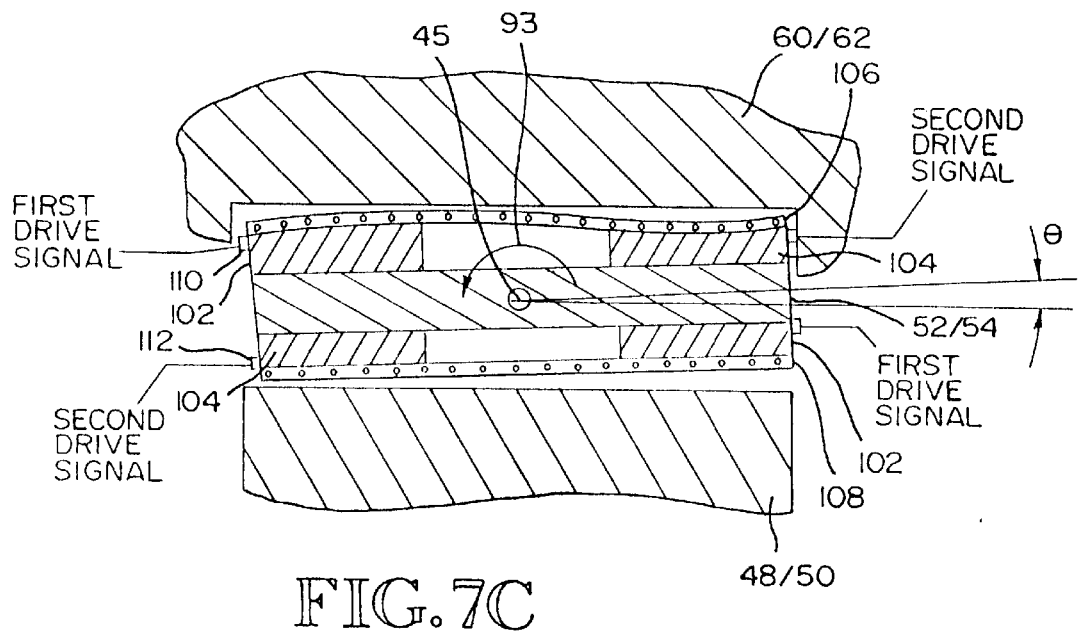

The movement of the support 44 is driven by a pair of piezoelectric circuits. One piezoelectric circuit is included at each end 52, 54 of the support 44. Each piezoelectric circuit includes a pair of first piezoelectric volumes 102, a pair of second piezoelectric volumes 104, a first insulator 106 and a second insulator 108. The insulator plates 106, 108 serve to electrically isolate the piezoelectric volumes 102, 104 from the cap 60/62 and base plate 46. As shown in FIGS. 7a–c, the first piezoelectric volumes 102 of a given piezoelectric circuit are located diagonally opposite each other on opposing sides of the support end 52/54. Similarly the second piezoelectric volumes 104 of a given piezoelectric circuit are located diagonally opposite each other on opposing sides of the support end 52/54.

The first piezoelectric volumes 102 receive a first drive signal at first contacts 110, 116. The second piezoelectric volumes 104 receive a second drive signal at second contacts 112, 114. The piezoelectric volumes 102, 104 have the same volume. Such volume is constant during the operation of the scanner 100. When a piezoelectric volume 102/104 receives a drive signal of a first potential, the shape of the piezoelectric volume 102/104 changes to be longer and thinner. When a piezoelectric volume 102/104 receives a drive signal of a second potential opposite the first potential, the shape of the piezoelectric volume 102/104 changes to be shorter and fatter. It is by controlling the first and second drive signals that the rotation of the support 44 is controlled.

In the embodiment shown in FIGS. 6 and 7 there are two piezoelectric circuits. At rest, when no drive signals are applied, the support 44 is level relative to the base plate 46 (see FIG. 7a). FIG. 7b shows a piezoelectric circuit at an initial rest position. By applying a first drive signal to the first piezoelectric volumes 102 of each circuit, the first volumes 102 change shape in the same manner. Such first volumes 102 are located at corresponding positions in each piezoelectric circuits. Thus, the one of the piezoelectric volumes 102 located on top of the end 52 is in the same position as the one volume 102 located on top of the end 54. The one of the piezoelectric volumes 102 located underneath the end 52 is in the same position as the one volume 102 located underneath the end 54.

By applying a second drive signal to the second piezoelectric volumes 104 of each circuit, the second volumes 104 change shape in the same manner. The one of the piezoelectric volumes 104 located on top of the end 52 is in the same position as the one volume 104 located on top of the end 54. The one of the piezoelectric volumes 104 located underneath the end 52 is in the same position as the one volume 104 located underneath the end 54. By having the first drive signal and second drive signal be of opposite polarity the shape of the first piezoelectric volumes 102 differs from that of the second piezoelectric volumes 104.

FIG. 7a shows the piezoelectric circuit in which the first piezoelectric volumes 102 get longer and thinner, while the second piezoelectric volumes 104 get shorter and fatter (relative to the initial shapes of FIG. 7b). Such deformation of the volumes 102,104 causes the support 44 to rotate in a first direction 93. After a prescribed time period, the polarity of the first drive signal and second drive signal are reversed. The support 44 at a first extreme deflection moving in a first direction of rotation 93 now reverses direction into a second direction 95 of rotation. The piezoelectric volumes 102,104 begin to changes shapes heading toward an opposite deformation. This causes the support 44 to return to the initial position of FIG. 7b and continue a rotation as shown in FIG. 7c toward a second extreme deflection. FIG. 7c shows the first piezoelectric volumes 102 deformed to be get shorter and fatter, while the second piezoelectric volumes 104 get longer and thinner (relative to the initial shapes of FIG. 7b). Again the polarities of the first and second drive signal are reversed bringing support 44 back to and through the initial position. Thus, FIG. 7a shows the support 44 moving toward a first extreme deflection. FIG. 7b shows the support 44 in the initial position. FIG. 7c shows the support 44 moving toward a second extreme deflection, opposite the first extreme deflection.

The rotational angle of the support 44 at any given time is labeled as θ. FIG. 5 shows respective waveforms (a), (b) and (c) for the first drive signal 94, the second drive signal 96 and the deflection angle θ. Note that during movement of the mirror 42, the first drive signal and second drive signal are at different polarities (or logic levels). Also note that the motion of the mirror 42 and support 44, as shown by the waveform for the deflection angle θ, is sinusoidal.

Retinal Display

Figure 8:
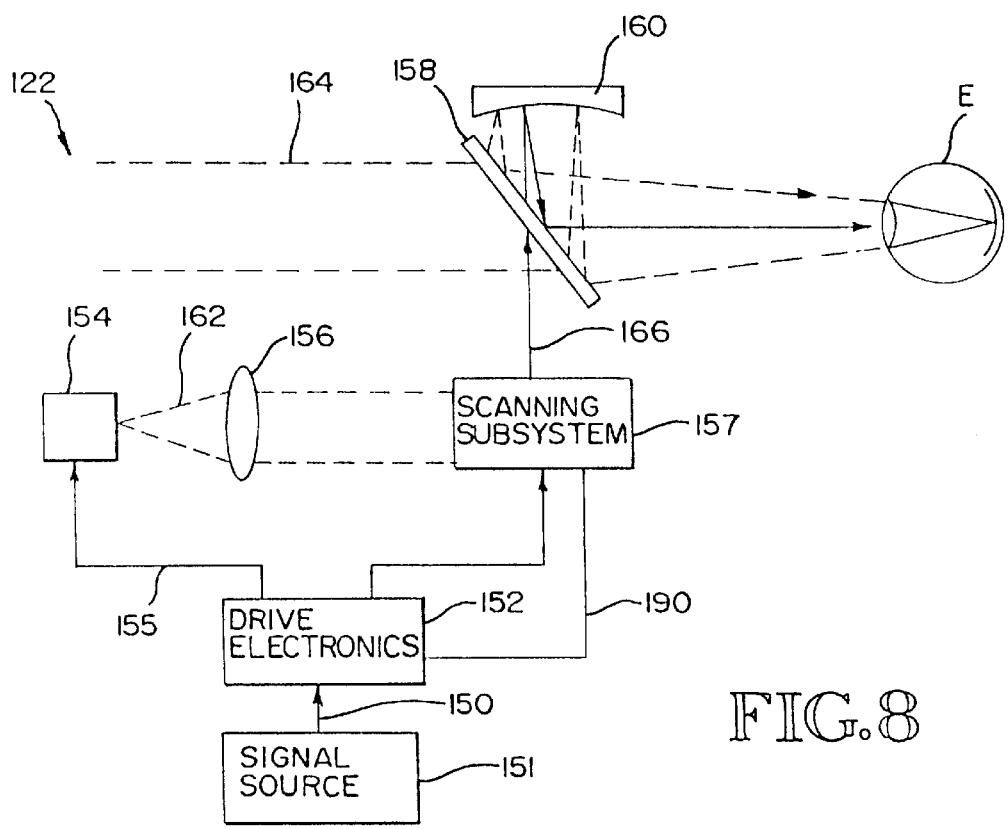
FIG. 8 is a block diagram of a virtual retinal display including a scanner of FIG. 2 or FIG. 6.

FIG. 8 is a block diagram of a retinal display 122 which generates and manipulates light to create color or monochrome virtual images having narrow to panoramic fields of view and low to high resolutions. The display 122 includes drive electronics 152, one or more light sources 154, a lensing or optics subsystem 156, and a scanning subsystem 157. In some embodiments the display 122 also includes a beam splitter 158 and/or an eyepiece 160.

The display 122 receives an image signal 150 from an image source 151, such as a computer device, video device or other digital or analog image data source. The image signal 150 is an RGB signal, NTSC signal, VGA signal or other formatted color or monochrome video or image data signal. Drive electronics 152 generate signals 155 for controlling the light source 154. The light source 154 includes one or more point sources of light. In one embodiment red, green, and blue light sources are included. Preferably the emitted light 162 is spatially coherent. In one embodiment the light source 154 is modulated based upon the signal 155 received. In another embodiment the light source includes a modulator which responds to the signal 155 received to modulate the light. The timing of the signal 155 corresponds to the mirror positions of the scanning subsystem 157. By outputting a known light color at known mirror positions vertical and horizontal location of an image pixel are defined. The light 162 output from the light sources 154 thus is modulated according to image data content and timing within the image signal 150. Such modulation and timing defines image elements or image pixels at desired locations within a scanning pattern.

The light 162 is output to the lensing system 156 and the scanning subsystem 157. The scanning subsystem 157 includes a horizontal scanner and a vertical scanner. Either one or both of such scanners are embodied by the scanner 40 or scanner 100. In another embodiment, the scanning subsystem includes a mechanical resonator for deflecting passing light. Typically the light is scanned along a raster pattern, although in an alternative embodiment another display format such as vector imaging can be used.

The scanning subsystem 157 deflects the light along a raster pattern toward the eye E, or as in the embodiment illustrated, toward a beam splitter 158 and concave mirror 160. The beam splitter 158 is useful for an augmented display which passes both background light 164 and image light 166 to the viewer's eye E. The concave mirror 160 serves to focus the light. The image pixels scanned onto the viewer's eye define a virtual image. The virtual image is updated and rescanned periodically so that the viewer perceives a continuous image.

The scanning subsystem 157 includes a sensor for detecting the phase or position of the mirror. Sensors detect when the mirror is at a known position. By detecting each time the mirror is at such known position, a phase difference is determined between the phase of the image data drive signal and the position phase of the mirror. The determined phase difference is corrected to keep the drive signal and mirror oscillation in phase. More specifically, the phase of an image data drive signal used for feeding image data onto the light beam being reflected by the scanner is locked relative to the position phase of the mirror oscillation action. By doing so, a uniform raster scanning pattern is defined by one or more scanners. One sensing method and apparatus is described in commonly-assigned U.S. Pat. No. 5,694,237 of co-inventor Charles D. Melville for "Position Detection Of Mechanical Resonant Scanner Mirror," issued Dec. 2, 1997, and incorporated herein by reference and made a part hereof.

FIG. 9 shows the support 44 underside 176. Two piezoelectric sensors 178, 180 are mounted to the underside 176 opposite the mirror 42. Each sensor 178, 180 is equidistant from the mirror's axis of rotation 45. Accelerated motion of a respective sensor 178/180 induces an electrical voltage across the component piezoelectric material. Changes in acceleration occur as changes in voltage. Zero acceleration corresponds to a constant "zero level" voltage output (e.g., ground or some voltage bias level). Sensor 178 generates an output voltage signal 182. Sensor 180 generates a output voltage signal 184.

As the mirror 42 moves along its deflection path from one extreme orientation to another extreme orientation, the mirror accelerates and decelerates. As the mirror 42 approaches the first extreme orientation the mirror slows, then reverses direction. This corresponds to a peak acceleration point. Similarly, as the mirror 42 approaches the second extreme orientation the mirror slows again and reverses direction. This also corresponds to a peak acceleration point. The two peaks correspond to accelerations of opposite magnitude. The mirror 42 achieves maximum velocity as it moves into the level orientation. Such maximum velocity corresponds to a zero acceleration point as the mirror stops speeding up and begins slowing down. A zero acceleration point occurs each time the mirror 42 assumes the level orientation.

As the zero acceleration point approaches, the sensor 178 voltage magnitude reduces to zero level (e.g., ground or bias voltage level). Similarly, the sensor 180 voltage magnitude also reduces to zero level. The direction of voltage change for the two sensors, however, varies. One is going from positive to negative polarity, while the other is going from negative to positive polarity. The zero crossover occurs at the same time for each sensor. By monitoring the zero crossovers one can detect when the mirror 42 is in the level orientation.

In one embodiment the sensor output signals 182, 184 are input to a differential amplifier 188. The amplifier 188 performs a common mode rejection outputting a difference signal 190, which is the difference between the voltages of the two signals 182, 184. The piezoelectric sensors 178, 180 respond to motion acceleration in any direction. Ideally the acceleration is only rotational about the axis of rotation 45. However, the scanner 40/100 itself is moving in some applications. To prevent such common motion from causing false zero crossover detections, the difference between the sensor output signals 182, 184 is monitored. The differential amplifier 188 subtracts out the voltage component corresponding to a common motion direction of the two sensors 178, 180. Any motion occurring along the axis of rotation 45 is sensed by each sensor 178, 180 as having opposite directions, and is not subtracted out. Any motion occurring along another axis is sensed in common by the sensors 178, 180 and is subtracted out. As a result, only the voltage components corresponding to motion in the rotational direction about axis 45 causes a zero crossover to be detected. The difference signal varies over time according to the oscillating path of the mirror 42 about the axis of rotation. The difference signal 190 exhibits a zero level at each zero acceleration position of the mirror (i.e., the level orientation). Thus, the difference signal 90 indicates the phase position of the mirror.

During each scan cycle there is an indication of the mirror being at a known position. This serves as a reference for synching the image data drive signal 155 and mirror position. In one embodiment the scanning subsystem 157 receives a horizontal-deflection drive signal and a vertical-deflection drive signal from the drive electronics 152. The horizontal-deflection and/or vertical-deflection drive signals are phase-adjusted to bring the image data drive signal 155 and mirror phase into the desired phase relationship.

Meritorious and Advantageous Effects

One advantage of this invention is that a piezoelectric drive circuit is light in weight and small in volume relative to prior conventional drive circuits formed with electromagnets and permanent magnets. An advantage of the spring quality and restoring force is that a resonant 'pendulum-like' system is achieved by adding a relatively small proportion of energy to the system at each swing (e.g., rotation or twist).

Although a preferred embodiment of the invention has been illustrated and described, various alternatives, modifications and equivalents may be used. Although the scanning subsystem is described as employing a torsionally flexed spring plate, a variety of other pivoting mechanisms, such as a bending spring or a rotating axle may be used to support the mirror. Further, although the scanning subsystem is preferably a resonantly oscillating device, the display may include a non-resonant piezoelectric scanner and be within the scope of the invention. Moreover, although the scanning subsystem is described as a multi-component assembly, integral structures, such as microelectromechanical devices, may be used. Therefore, the foregoing description should not be taken as limiting the scope of the inventions which are defined by the appended claims.

What is claimed is:

1. An optical scanner, comprising:

a torsional support for alternately twisting in a periodic manner about an axis of rotation in a first direction and a second direction, wherein the twisting in the first direction occurs between a first extreme rotational position and a second extreme rotational position, and wherein the twisting in the second direction occurs between the second extreme rotational position and the first extreme rotational position;

a reflective surface for deflecting light, the reflective surface moving with the support, wherein the alternate rotation of the support about the axis of rotation defines an oscillatory motion of the reflective surface;

a piezoelectric circuit mechanically coupled to the support, the piezoelectric circuit comprising a first piezoelectric volume and a second piezoelectric volume, wherein during a first portion of a drive cycle the first piezoelectric volume receives a first drive signal causing the first piezoelectric volume to deform and the second piezoelectric volume receives a second drive signal causing the second piezoelectric volume to deform, the second drive signal of opposite polarity to the first drive signal causing the second piezoelectric volume to deform in a manner opposite deformation of the first piezoelectric volume, wherein the deformation of the first piezoelectric volume and the second piezoelectric volume in response to the first drive signal and second drive signal causes the support to twist in the first direction between the first extreme rotational position and the second extreme rotational position, and wherein during a second portion of the drive cycle the polarity of the first drive signal and the second drive signal reverse again causing the first piezoelectric volume to deform and the second piezoelectric volume to deform, the first piezoelectric volume deforming in a manner opposite deformation of the second piezoelectric volume, wherein the deformation of the first piezoelectric volume and the second piezoelectric volume during the second portion of the drive cycle causes the support to twist in the second direction between the second extreme rotational position and the first extreme rotational position.

2. The scanner of claim 1, wherein the piezoelectric circuit further comprises a frame which is attached to the support and to which are attached the first piezoelectric volume and the second piezoelectric volume, wherein the deformation of the first piezoelectric volume and the second piezoelectric volume bends the frame, which in turn twists the support.

3. The scanner of claim 1, in which the support has a first portion and a second portion, wherein the piezoelectric circuit is a first piezoelectric circuit coupled to the first portion of the axle, and further comprising:

a second piezoelectric circuit mechanically coupled to the support, the second piezoelectric circuit comprising a third piezoelectric volume and a fourth piezoelectric volume, wherein during the first portion of the drive cycle the third piezoelectric volume receives the first drive signal causing the third piezoelectric volume to deform and the fourth piezoelectric volume receives the second drive signal causing the fourth piezoelectric volume to deform, the second drive signal of opposite polarity to the first drive signal causing the fourth piezoelectric volume to deform in a manner opposite deformation of the third piezoelectric volume, wherein the deformation of the third piezoelectric volume and the fourth piezoelectric volume in response to the first drive signal and second rive signal causes the support to twist in the first direction between the first extreme rotational position and the second extreme rotational position, and wherein during the second portion of the drive cycle the polarity of the first drive signal and the second drive signal reverse again causing the third piezoelectric volume to deform and the fourth piezoelectric volume to deform, the third piezoelectric volume deforming in a manner opposite deformation of the fourth piezoelectric volume, wherein the deformation of the third piezoelectric volume and the fourth piezoelectric volume during the second portion of the drive cycle causes the support to twist in the second direction between the second extreme rotational position and the first extreme rotational position.

4. The scanner of claim 3, in which the support comprises an elongated portion having a first end portion and a second end portion, and wherein said first portion of the support is said first end portion and said second portion of the support is the second end portion.

5. The scanner of claim 3, in which the support further comprises a first end portion adjacent to said first portion and a second end portion adjacent to said second portion, and wherein the scanner further comprises a base for supporting the first end portion and second end portion.

6. An optical scanner, comprising:

a base;

a support for alternately moving about an axis of rotation in a first direction and a second direction, wherein the movement in the first direction occurs between a first extreme position and a second extreme position, and wherein the movement in the second direction occurs between the second extreme position and the first extreme position, wherein the support comprises a first portion and a second portion;

a reflective surface for deflecting light, the reflective surface moving with the support, wherein the alternate rotation of the support about the axis of rotation defines an oscillatory motion of the reflective surface;

a first piezoelectric circuit comprising a first piezoelectric volume, a second piezoelectric volume, and a first frame, wherein the first frame is attached to the base, the first portion of the support, the first piezoelectric volume and the second piezoelectric volume, and wherein during a first portion of a drive cycle the first piezoelectric volume receives a first drive signal causing the first piezoelectric volume to deform and the second piezoelectric volume receives a second drive signal causing the second piezoelectric volume to deform, the second drive signal of opposite polarity to the first drive signal causing the second piezoelectric volume to deform in a manner opposite deformation of the first piezoelectric volume, wherein the deformation of the first piezoelectric volume and the second piezoelectric volume in response to the first drive signal and second drive signal causes the first frame to bend, which in turn causes the support to move in the first direction between the first extreme position and the second extreme position, and wherein during a second portion of the drive cycle the polarity of the first drive signal and the second drive signal reverse again causing the first piezoelectric volume to deform and the second piezoelectric volume to deform, the first piezoelectric volume deforming in a manner opposite deformation of the second piezoelectric volume, wherein the deformation of the first piezoelectric volume and the second piezoelectric volume during the second portion of the drive cycle causes the first frame to bend, which in turn causes the support to move in the second direction between the second extreme position and the first extreme position;

a second piezoelectric circuit comprising a third piezoelectric volume, a fourth piezoelectric volume and a second frame, wherein the second frame is attached to the base, the second portion of the support, the third piezoelectric volume and the fourth piezoelectric volume, and wherein during the first portion of the drive cycle the third piezoelectric volume receives the first drive signal causing the third piezoelectric volume to deform and the fourth piezoelectric volume receives the second drive signal causing the fourth piezoelectric volume to deform, the second drive signal of opposite polarity to the first drive signal causing the fourth piezoelectric volume to deform in a manner opposite deformation of the third piezoelectric volume, wherein the deformation of the third piezoelectric volume and the fourth piezoelectric volume in response to the first drive signal and second drive signal causes the second frame to bend, which in turn causes the support to move in the first direction between the first extreme position and the second extreme position, and wherein during the second portion of the drive cycle the polarity of the first drive signal and the second drive signal reverse again causing the third piezoelectric volume to deform and the fourth piezoelectric volume to deform, the third piezoelectric volume deforming in a manner opposite deformation of the fourth piezoelectric volume, wherein the deformation of the third piezoelectric volume and the fourth piezoelectric volume during the second portion of the drive cycle causes the second frame to bend, which in turn causes the support to move in the second direction between the second extreme position and the first extreme position.

7. The scanner of claim 6, in which the support comprises an elongated portion having a first end portion and a second end portion, and wherein said first portion of the support is said first end portion and said second portion of the support is the second end portion.

8. The scanner of claim 6, in which the support further comprises a first end portion adjacent to said first portion and a second end portion adjacent to said second portion, and wherein the base supports the first end portion and second end portion.

9. A method for driving cyclic motion of an optical scanner having a support, a reflective surface and a piezoelectric circuit, wherein the support alternately moves about an axis in a first direction and a second direction, wherein the movement in the first direction occurs between a first extreme position and a second extreme position, and wherein the movement in the second direction occurs between the second extreme position and the first extreme position, and wherein the reflective surface is for deflecting light, the reflective surface moving with the support, and wherein the alternate motion of the support about the axis defines an oscillatory motion of the reflective surface; and wherein the piezoelectric circuit comprises a first piezoelectric volume and a second piezoelectric volume, the method comprising the steps of:

during a first portion of a first drive cycle for the scanner, inputting a first drive signal to the first piezoelectric volume and a second drive signal to the second piezoelectric volume, the first drive signal and second drive signal being of opposite polarity, the first drive signal causing the first piezoelectric volume to deform, the second drive signal causing the second piezoelectric volume to deform, the first drive signal causing the first piezoelectric volume to deform in a manner opposite deformation of the second piezoelectric volume, wherein the deformation of the first piezoelectric volume and the second piezoelectric volume in response to the first drive signal and second rive signal causes the support to move in the first direction between the first extreme position and the second extreme position; and reversing the polarity of the first drive signal and of the second drive signal during a second portion of the first drive cycle causing the first piezoelectric volume to deform in a manner opposite deformation of the second piezoelectric volume, and in turn causing the support to move in the second direction between the second extreme position and the first extreme position; and repeating the steps of inputting and reversing for subsequent drive cycles to generate oscillatory motion of the support in alternating first and second directions during the respective first and second portions of said subsequent drive cycles.

10. The method of claim 9, wherein the support is a torsion spring which twists in response to deformation of the first piezoelectric volume and second piezoelectric volume.

11. The method of claim 9, wherein the oscillatory motion of the reflective surface occurs at a resonant frequency.

* * * * *